Patented Apr. 27, 1948

2,440,237

UNITED STATES PATENT OFFICE 2,440,237

RESINOUS POLYMERS OF UNSATURATED ETHEREAL ESTERS

David E. Adelson, Berkeley, and Hans Dannenberg, Berkeley Highlands, Calif., assignors to Shell Development Company, San Francisco, Calif., a corporation of Delaware No Drawing. Application February 1, 1944, Serial No. 520,688

17 Claims. (Cl. 260—78.3)

This invention relates to novel synthetic resins and polymers and to a process for their preparation. More particularly, the invention pertains to polymerization of the members of a class of unsaturated ethereal esters and to the polymers and resins obtained thereby.

It is an object of the present invention to provide a class of resinous materials which have excellent adhesiveness to metal and are particularly impervious to acidic substances, organic materials and dilute alkalis as well as being tasteless and odorless and having the required heat stability to hot water used in sterilizing containers, which combination of properties makes them desirable for coating or lining food and beverage containers. Another object is to provide resinous polymers which are suitable for covering metal surfaces with an ornamental and protective covering such as is used on automobile bodies.

A further object is to provide a process for preparing the novel resins. Other objects will be apparent from the description of the invention given hereinafter.

We have discovered that unsaturated ethereal esters like allyl alloxyacetate and related compounds can be polymerized to useful polymeric and resinous materials. These unsaturated ethereal esters which are polymerized according to the method of the present invention may be represented by the general formula

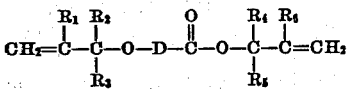

wherein D is a divalent hydrocarbon radical or a substituted divalent hydrocarbon radical having as substituent one or more halogen atoms, alkoxy, or aryloxy groups, and $R_1$, $R_2$, $R_3$, $R_4$, $R_5$ and $R_6$ are the same or different substituents which are hydrogen atoms, halogen atoms or hydrocarbon radicals such as alkyl groups, alicyclic groups or aryl groups. The divalent hydrocarbon radical D, which may or may not be substituted, is aliphatic, aromatic or alicyclic in character. Allyl alloxyacetate is the particularly preferred compound which is represented in the above formula when D is a methylene group (—$CH_2$—) and the R's having subscripts are all hydrogen atoms. Preferred compounds of the class are oxyacetates in which D of the above formula is a methylene group, which compounds include alpha-methylallyl alloxyacetate, allyl beta-methylalloxyacetate, alpha-chlorallyl beta-propylalloxyacetate, beta - bromallyl beta - cyclohexylalloxyacetate, beta-methylallyl beta-methylalloxyacetate, alpha-phenylallyl alloxyacetate, alpha-methylallyl alpha-methylalloxyacetate, alpha-chlormethylallyl alloxyacetate, alpha,beta-dimethylallyl alloxyacetate and the like. Less preferred compounds are those in which D represents a more complex divalent hydrocarbon radical like ethylene, propylene, trimethylene, phenylene, cyclopentylene, etc., as is exemplified by compounds like allyl alpha-alloxypropionate, allyl beta-alloxypropionate, allyl alpha-alloxyisobutyrate, beta-methylallyl alpha-alloxypropionate, beta-methylallyl alpha-(beta-methylalloxy) propionate, alpha-ethylallyl beta-(beta-chloralloxy) butyrate, beta-bromallyl delta-alloxyvalerate, allyl alpha-alloxystearate, allyl alloxybenzoate, beta-methylallyl alloxybenzoate, beta-cyclohexylallyl gamma-alloxybutyrate, beta-methylallyl (beta-methylalloxy) benzoate, allyl alloxyhexahydrobenzoate, alpha-methylallyl alpha-alloxypropionate and the like. It is evident from the foregoing typical compounds employed in the invention that when D is a divalent saturated unsubstituted hydrocarbon radical, the radical may contain 1 to 17 carbon atoms.

When D is a substituted divalent hydrocarbon radical, the substituent is a halogen atom like chlorine, bromine, iodine or fluorine; or an alkoxy group like methoxy, ethoxy, isopropoxy, butoxy, hexoxy, dodecoxy, etc.; or an alkenoxy group like alloxy, crotoxy, isopropenoxy, 2-hexenoxy, isopentenoxy, 3-nonenoxy, etc.; or an aryloxy group like phenoxy, toloxy, xyloxy, naphthoxy, etc. Typical compounds of this subgroup include allyl alpha- chlor- beta- alloxypropionate, beta-methylallyl alpha-methoxy-gamma-alloxybutyrate, alpha-ethylallyl o-crotoxy-p-alloxyhexahydrobenzoate, allyl 3-phenoxy-5-alloxybenzoate and the like. For convenience in further describing the invention, the compounds which are represented by the above general formula will be henceforth referred to as unsaturated ethereal esters.

The unsaturated ethereal esters which are polymerized to valuable resinous materials by the method of this invention can be prepared by several methods. The compounds are conveniently obtained by reacting the appropriate chlor-substituted carboxylic acid with the sodium alcoholate of the beta,gamma-unsaturated alcohol and esterifying the resulting unsaturated ethereal acid with the desired unsaturated alcohol to form the unsaturated ethereal ester. For example, allyl beta-(beta-methylalloxy) propionate is prepared by heating a mixture of beta-chloropropionic acid with sodium beta-methylalloxide. The formed beta-(beta-methylalloxy) propionic acid is purified by fractional distillation, although fractional crystallization may be used with more complex ether acids, and is esterified in the usual manner with allyl alcohol in the presence of a suitable catalyst like phosphoric acid. The unsaturated ethereal esters containing substituents as noted above can also be prepared by similar methods. Thus allyl beta-methoxy-alpha-alloxy-butyrate is prepared by reacting beta-chlorobutyric acid with sodium methoxide to give beta-methoxybutyric acid which is chlorinated to yield beta-methoxy-alpha-chlorobutyric acid. The formed chlor-containing acid is then reacted with sodium alloxide to produce beta-methoxy-alpha-alloxybutyric acid which is esterified with allyl alcohol to form the desired unsaturated ethereal ester. The chlorocarboxylic acids employed as starting materials are obtained by the usual methods well known in the art. The beta-unsaturated ethereal esters are conveniently prepared by another more special method. For instance beta-ethylallyl beta-(beta-ethylalloxy) propionate is obtained by heating methyl acrylate containing a polymerization inhibitor like hydroquinone with beta-ethylallyl alcohol in the presence of the corresponding sodium alcoholate as catalyst. The mixture is boiled and formed methyl alcohol is removed as distillate; the reactions involve ester exchange of beta-ethylallyl alcohol for methyl alcohol as well as addition of the unsaturated alcohol to the double bond of the acid portion of the ester.

According to the process of the invention the unsaturated ethereal esters are subjected to polymerization by the action of heat, light, or other polymerization catalysts. Heat alone is very slow, requiring several hundred hours unless elevated temperatures of about 200° C. to 250° C. are used, and in employing such high temperatures the use of superatmospheric pressures is necessary where the operating temperature is above the boiling point of the liquid, since it appears that the polymerization reaction occurs in the liquid phase. For this purpose, sufficient pressure is employed to maintain at least a part of the polymerizable compound in the liquid phase. When light is used as polymerization catalyst best results are obtained with radiation in the ultra-violet region of the spectrum. Preferably the polymerization is effected by the combined action of heat and an oxygen-yielding compound with the temperature of operation at from 50° C. to 250° C. The preferred catalyst used in combination with heat is either a molecular oxygen-containing gas or a peroxide compound. Gases containing molecular oxygen are particularly suitable, such as pure oxygen, air or oxygen in admixture with inert gases like carbon dioxide, methane, helium, nitrogen, etc. The peroxide compounds having use as catalysts include benzoyl peroxide, hydrogen peroxide, barium peroxide, sodium peroxide, tetralin peroxide, olefin peroxides, acetyl peroxide, tertiary butyl peroxide, acetone peroxide, and the like. Among other oxygen-yielding compounds which may be employed as catalysts are the alkali metal perborates and the alkali metal persulfates.

When an oxygen-containing gas is employed as catalyst it is ordinarily desirable to operate at temperatures of from 100° C. to 150° C.; in this case the unsaturated ethereal ester is heated and the oxygen-containing gas such as air is brought into intimate contact with the reactant, for example by dispersing the gas through the reaction mass in the form of fine bubbles.

Of the peroxide polymerization catalysts, benzoyl peroxide is the preferred compound. As with other catalysts, although larger or smaller amounts may be used if desired, about 0.1% to 5% of benzoyl peroxide is incorporated with the unsaturated ethereal ester and the mixture is heated. The conditions of temperature and pressure are regulated so that at least a part of the reactant is in the liquid phase so as to have a condition conducive to the desired polymerization. While a temperature between about 50° C. and 250° C. may be used with the peroxide catalysts such as benzoyl peroxide, the preferred temperature is from about 50° C. to 100° C. As is known, higher temperatures generally increase reaction speeds and this has been found to be true for the polymerization reaction which occurs in the process of the invention. However, temperatures markedly above the preferred range for the peroxide catalysts tend to decompose the peroxide catalyst, and since the presence of the catalyst in the reaction mixture is necessary for a practical rate of polymerization, the polymerization reaction will be greatly decreased after destruction of the catalyst by the high temperature. We have found this difficulty may be overcome when operating at high temperatures by adding additional catalyst to the reaction mixture during the course of the polymerization in the form of portions from time to time or continuously. Preferably, of course, the temperature is maintained below that at which appreciable decomposition of the catalyst occurs although even in such instances intermittent addition of fresh catalyst may be made if desired.

The polymers of the unsaturated ethereal esters exist in several physical forms which are dependent upon the degree of polymerization attained in their preparation. The compounds polymerized contain at least two polymerizable olefinic groups and, since the compounds are polyfunctional, it is believed that polymers which are hard, infusible and insoluble are formed by chain formation with cross linking. Polymers which are viscous liquids or gels are obtained when the polymerization reaction is interrupted before appreciable cross linking occurs. The polymerization proceeds through the following stages: mobile liquid (monomer), viscous liquid (soluble polymer), gel (fusible, but insoluble polymer) and, finally, hard resin (insoluble and infusible polymer). Thus when the poymerization is stopped before gel formation occurs, the viscous liquid state is attained in which the polymer is soluble in many common organic solvents. By discontinuing the polymerization after the gel is obtained, but before the gel has hardened, a moldable form of the polymer is produced.

The soluble, fusible modification of the polymer is obtained by interrupting the polymerization before gel formation occurs and separating the soluble polymers from the unpolymerized monomer. The polymerization may be interrupted by numerous expedients such as discontinuing the heating or by destroying the catalyst, for example, by adding a reducing agent to the reaction mixture. In preparing the soluble form of the polymer, it is desirable that the polymerization reactions be arrested before gel formation occurs. This may be easily accomplished by following the course of the polymerization with observations of the refractive index of the reaction mixture. In general, the refractive index of the polymeric form of the unsaturated ethereal esters increases as the degree of polymerization progresses so that a simple experiment may be made wherein the reactant is polymerized until gel formation occurs to obtain data on the value of the refractive index when gel is formed, and this data may then be used to control the polymerization so that the reactions are interrupted prior to gel formation.

In obtaining the soluble, viscous liquid form of the polymer, it is desirable that the polymer be substantially freed of monomer. While various methods may be employed for this purpose, a distillation step is ordinarily preferred. The reaction mixture contains the soluble polymer, monomer, and possibly the polymerization catalyst, if a catalyst other than an oxygen-containing gas has been employed. By subjecting this mixture to steam distillation under subatmospheric pressure, it is possible to separate the monomer from the soluble polymers. Although the presence of the water in the mixture undergoing distillation presumably greatly inhibits further polymerization of the soluble polymers to the insoluble gel form, it is desirable that the pressure under which the distillation is conducted be sufficiently low so that the temperature of distillation does not become conducive to further polymerization. In this manner, the monomer is removed as an azeotrope with water and the soluble polymer remains. If desired, the monomer may be separated by an extraction step. The reaction mixture after polymerization is treated with a substance which is a solvent for the monomer, but a non-solvent for the polymer. Suitable materials for this operation include alcohols—e. g., methyl alcohol, isopropyl alcohol, the butyl alcohols, the amyl alcohols, dodecanols, etc.; ethers—e. g., ethyl ether, isopropyl ether, butyl ethers, etc.; and aliphatic hydrocarbons—e. g., hexanes, heptanes, octanes, etc. Treatment of the reaction mixture with such solvents dissolves the monomer and the resulting solution may be removed leaving the polymer which is thus separated from the reaction mixture.

This soluble modification of the polymer is particularly suitable for surface coating purposes. For this use, it may be employed as a solution in a suitable solvent. Typical solvents for the polymer include ketones—e. g., acetone, methyl ethyl ketone, methyl isobutyl ketone, cyclopentanone, cyclohexanone, etc.; esters—e. g., ethyl acetate, isopropyl acetate, the butyl acetates, etc.; aromatic hydrocarbons—e. g., benzene, toluene, etc.; and chlorinated hydrocarbons—e. g., ethylene dichloride, trichlorethylene, chlorobenzene, etc. If desired, a mixture of solvents may be employed or a mixture containing non-solvents in such proportion that the whole mixture acts as a solvent for the polymer. The solution of the polymers is applied to a surface which is desired to be covered, and the resulting film of polymers subjected to a baking treatment to convert the soluble polymer to the insoluble form.

When the polymer is applied as a thin film, the oxygen of the air acts as a catalyst to complete the polymerization of the polymer. If desired, of course, a peroxide polymerization catalyst may be incorporated with the polymer to aid and to shorten the time of the conversion to the solid resin during the baking treatment. Other catalysts, such as the siccatives like the cobalt, manganese and/or lead salts, may be used to complete the polymerization. If desired, other ingredients may be used in the surface-coating compositions such as pigments, plasticizers, resins, and the like. The soluble form of the polymer may also be used for impregnating compositions, film-forming compositions, adhesives, plastics and the like.

Polymer-coated metal containers of the invention are particularly useful for storage and transport of foods and beverages. For this purpose, a metallic container is coated with a solution of the soluble polymer in a volatile solvent and the container subjected to a baking treatment with completion of the polymerization of the soluble polymer. In this manner, the surface of the container is coated with a film of the insoluble polymer which is particularly adhesive to the metal and resistant and impervious to the acidic character of foodstuffs and beverages. It is preferred to use polymers of allyl alloxyacetate for coating the containers. While various metals may be employed, such as copper, aluminum, tin-plated iron or steel, etc., it is ordinarily desirable and most practical to use ferruginous metals like iron or steel for the containers. It has been found that very desirable resin films may be put on the ferruginous metal containers by preparing the polymer lacquer with solvents known in the lacquer art as high boiling solvents and having present a plasticizer. Such a composition is applied and the coated container baked, whereby the solvents slowly evaporate during further polymerization of the polymer. If desired, multiple coats of the resin or polymer may be used. The coated container which may, if desired, be coated only on the interior, may be filled and sealed in the usual manner which is well known. In some instances it may be desirable to apply a primer coat to the metal surface, such as an alkyd resin, before application of the soluble polymer.

The gel form of the polymer, which is insoluble but moldable and thermosetting, is another useful modification of the invention. This moldable polymer is obtained by subjecting the unsaturated ethereal esters to polymerization until gel formation and interrupting the polymerization at this point. The gel may be separated from other constituents of the reaction mixture by treating the mixture with an organic solvent and extracting lower soluble polymers and unpolymerized monomers so as to leave essentially only the gel.

A preferred method of separating the monomer from the gel is by subjecting the mixture to steam distillation, preferably under subatmospheric pressure, whereby the monomer is removed as distillate and the gel remains, since it has been found to be non-distillable under these conditions.

For the preparation of molded articles, the gel is subjected to the action of heat and pressure in the presence of a polymerization catalyst to complete polymerization of the polymer. When a solid or liquid catalyst has been used in the preparation of the gel, sufficient catalyst may remain in the gel so that further addition of catalyst for the molding operation is unnecessary. However, in those cases where it is deemed desirable to incorporate additional quantities of catalyst with the gel, it is preferable to first crush or grind the gel to particles of small size. The catalyst may be mixed with the crushed or ground gel by treating it with a solution of the catalyst. Thus the gel may be soaked in a solution of the catalyst, the solution drained from the gel and the treated gel dried. Other methods may be used to incorporate the catalyst with the gel, if desired, such as mixing and working dry catalyst into the gel. The gel containing the catalyst is molded at temperatures of about 100° C. upwards, but not so high that decomposition or charring occurs, e. g. up to 300° C., and simultaneously applying sufficient pressure, e. g. several thousand pounds per square inch, to press the gel into a coherent mass for completion of the polymerization reactions.

The gel form of the polymer is advantageously prepared by the use of heat and a molecular oxygen-containing gas. According to this method the unsaturated ethereal ester is heated and brought into intimate contact with the oxygen-containing gas whereby polymerization occurs. The treatment of the ester at elevated temperatures with the oxygen-containing gas permits the polymerization to progress until the gel modification of the polymer is attained and the polymerization automatically stops at this point with substantially no formation of infusible and insoluble polymer. By the use of the oxygen-containing gas as polymerization catalyst in this manner, the gel polymer is produced in the reaction mixture and any unchanged material may be separated therefrom either by the low pressure steam distillation method or extraction with a solvent. The gel obtained in this manner is in a condition suitable for molding, which operation is preferably effected after incorporating one or more of the peroxide catalysts, as was hereinbefore discussed.

For the purpose of further illustrating the invention in greater detail, the following examples are given, it being understood, however, that the invention is not to be construed as limited to the particular details given therein.

*Example I*

Ninety-two gms. of freshly cut sodium was dissolved in 835 gms. of allyl alcohol in a flask fitted with a reflux condenser, stirrer and dropping funnel. A mixture of 189 gms. of chloracetic acid dissolved in 236 gms. of allyl alcohol was added dropwise with stirring to the contents of the flask. The reaction mixture was heated to the boiling point during the addition and a precipitate of sodium salts was formed during the reaction with the evolution of considerable heat. After the reaction, 500 cc. of the allyl alcohol was removed by distillation under vacuum and 750 cc. of water was added to the residue after which the distillation was continued until the excess allyl alcohol had been removed. The distillation residue was cooled and treated with a slight excess of concentrated hydrochloric acid to liberate the free acid. Two phases formed in the treatment which were separated, and the lower aqueous phase was extracted several times with diisopropyl ether. Two ether extracts were combined with the upper phase and the whole was dried over anhydrous sodium sulfate. The ether was removed by evaporation and the residue flask distilled under vacuum. The fraction boiling from 120° C. to 135° C. at 25 mm. was saved and redistilled to give the product which boiled between 124° C. and 126° C. at 22 mm. The yield of alloxyacetic acid was about 74%. Determination of physical properties and analytical data gave the following results for the alloxyacetic acid:

Boiling point, °C. _____ 124–126 at 22 mm.
Density, 20/4 _____ 1.111
Refractive index (Abbé), 20/D _____ 1.445
Equivalent weight _____ 124.0
    Theoretical _____ 116
Carbon, per cent _____ 50.6
    Theoretical _____ 51.7
Hydrogen, per cent _____ 7.0
    Theoretical _____ 6.9

Allyl alloxyacetate was obtained by esterifying the alloxyacetic acid with allyl alcohol. A mixture of alloxyacetic acid and allyl alcohol to which a quantity of phosphoric acid had been added as catalyst and benzene to remove the formed water was boiled in a vessel fitted with a fractionating column. The water of reaction was distilled from the reaction mixture as an azeotrope with the benzene. After the theoretical amount of water had been separated, the product was treated with calcium carbonate to destroy the catalyst, filtered and distilled. A yield of about 77% of the ester was obtained which was a colorless, water insoluble oil with a pleasant ester odor. Analysis and determination of physical properties gave the values tabulated below:

Boiling point, °C. _____ 114–115 at 45 mm.
Density, 20/4 _____ 0.999
Refractive index, 20/D _____ 1.442
Saponification value, equiv. per 100 gms___ 0.641
    Theoretical _____ 0.641
Carbon, per cent _____ 61.5
    Theoretical _____ 61.6
Hydrogen, per cent _____ 7.7
    Theoretical _____ 7.7

About 2% of benzoyl peroxide was dissolved in allyl alloxyacetate and the mixture was polymerized by heating at 80° C. After five days, the liquid gelled and, upon further heating, the gel hardened to a brittle material. The final product still contained about 40% of monomer. On evaporation of the monomer, a hard non-moldable and insoluble resin was obtained.

*Example II*

About 15 grams of allyl alloxyacetate was heated at 125° C. to 130° C. while bubbling therethrough a slow stream of air. The heating was done in a vessel equipped with a reflux condenser to avoid loss of monomer. The initial refractive index of the monomer was $n_D^{20}$ 1.4433 and this increased to 1.4585 after 6 hours of heating. The liquid gelatinized after another 5½ hours of heating; the heating and air treatment was continued for an additional hour and then stopped; the gel was extracted with acetone which dissolved the unchanged monomer and also removed some soluble polymer. The insoluble gel fraction amounted to about 3½ grams.

The gel was crushed and soaked in a solution of dioxane containing 1% of benzoyl peroxide for 16 hours, filtered and dried in vacuo in order to incorporate the catalyst. The product thus obtained was molded at about 150° C. and 7000 lbs. p. s. i. pressure for 20 minutes; a hard, yellow, translucent, insoluble and infusible resin resulted which had excellent properties.

Example III

About 96 gms. of methyl acrylate to which had been added 0.2 gm. of hydroquinone was mixed with 215 gms. of allyl alcohol which had 2.2 gms. of clean metallic sodium dissolved therein. Upon the mixing, an immediate green color developed with liberation of much heat. The reaction mixture became turbid and brown and it was necessary to cool the contents of the reaction vessel by running water thereover. After the initial reaction had subsided, the reaction mixture was distilled and about 31 cc. of methyl alcohol recovered as distillate, after which 100 cc. of allyl alcohol was removed. Water was added to the reaction mixture and two extractions thereof were made with isopentane. The extract was distilled at normal pressure to a still head temperature of 32° C. and the residue was then distilled in vacuo. About 100 gms. of allyl beta-alloxypropionate was recovered, which boiled between 74.2 and 75.8° C. at 4-5 mm. pressure. The product had a density (20/4) of 0.9875 and refractive index (20/D) of 1.4424. Its ester value (eq. per 100 gms.) was 0.600 as compared to a theoretical value of 0.588 for the ester. The molecular refraction was found to be 45.63 in comparison with the calculated value of 46.13.

Allyl beta-alloxypropionate was heated with 1%, 2% and 3% benzoyl peroxide at 65° C. Polymerization of the compound occurred after 14 days heating, increased polymerization occurring with larger amounts of catalyst. The formed soluble and fusible polymer could be separated from the unreacted monomer by distillation with steam under reduced pressure.

Example IV

Alpha-alloxypropionic acid was prepared according to the method described in Example I from alpha-chloropropionic acid and sodium allyl-oxide in allyl alcohol. The acid, a water white, viscous liquid, was obtained in a yield of 59%. The product on analysis and determination of physical properties gave the following results:

| | |
|---|---|
| Boiling point, °C. | 100.4–102.5 at 9 mm. |
| Specific gravity, 20/4 | 1.052 |
| Refractive index, 20/D | 1.438 |
| Carbon, per cent | 54.91 |
| Theoretical | 55.37 |
| Hydrogen, per cent | 7.68 |
| Theoretical | 7.75 |
| Bromine no., equiv. per 100 gms | 123 |
| Theoretical | 122.8 |
| Acid value, equiv. per 100 gms | 0.767 |
| Theoretical | 0.768 |

The alpha-alloxypropionic acid was esterified with allyl alcohol using para-toluenesulfonic acid as catalyst and employing benzene to remove the water of reaction as an azeotrope. The formed ester was a water white viscous liquid which was obtained in 91% yield and had the properties tabulated below:

| | |
|---|---|
| Boiling point, °C. | 96.4–97.0 at 24 mm. |
| Specific gravity, 20/4 | 0.972 |
| Refractive index, 20/D | 1.437 |
| Carbon, per cent | 63.04 |
| Theoretical | 63.51 |
| Hydrogen, per cent | 8.29 |
| Theoretical | 8.29 |
| Bromine no., equiv. per 100 gms | 186 |
| Theoretical | 188 |
| Ester value, equiv. per 100 gms | 0.594 |
| Theoretical | 0.588 |

The allyl alpha-alloxypropionate was polymerized at elevated temperature with the aid of organic peroxide catalysts. The polymerization treatment extended over a period of 9 days and the following results were obtained:

| Catalyst | Percentage Catalyst | Temperature °C. | Time to Gel Hrs. | Condition after 9 Days |
|---|---|---|---|---|
| Benzoyl peroxide | 5 | 65 | 36–44 | Gel. |
| Do | 5 | 90 | 24–36 | Do. |
| Do | 2 | 65 | | Viscous liquid. |
| Do | 2 | 90 | | Do. |
| Ditertiary butyl peroxide | 5 | 90 | 36–44 | Gel. |
| Do | 2 | 90 | 55–65 | Do. |

This application is a continuation-in-part of our copending applications, Serial No. 351,236, filed August 3, 1940, now Patent No. 2,386,999, and Serial No. 410,164, filed September 9, 1941, now abandoned.

We claim as our invention:

1. A polymer of a compound represented by the general formula

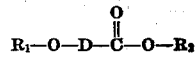

wherein $R_1$ and $R_2$ are each the hydrocarbon radical directly linked to the hydroxyl group of a beta,gamma-monoolefinic monohydric alcohol having the carbon atom of a terminal methylene group as the gamma carbon atom thereof, and D is a divalent saturated unsubstituted hydrocarbon radical of 1 to 17 carbon atoms.

2. An insoluble and infusible polymer of the compound represented by the general formula

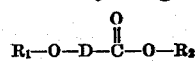

wherein $R_1$ and $R_2$ are each the hydrocarbon radical directly linked to the hydroxyl group of a beta,gamma-monoolefinic monohydric alcohol having the carbon atom of a terminal methylene group as the gamma carbon atom thereof, and D is a divalent saturated unsubstituted hydrocarbon radical of 1 to 17 carbon atoms.

3. A polymer of allyl alloxyacetate.

4. A polymer of allyl alpha alloxypropionate.

5. An insoluble and infusible polymer of allyl alloxyacetate.

6. An insoluble and infusible polymer of allyl alpha alloxypropionate.

7. A process for the production of polymer which comprises heating in the liquid phase at a temperature in the range of 50° C. to 250° C. until appreciable polymerization has occurred a compound represented by the general formula

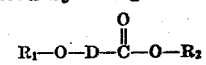

wherein $R_1$ and $R_2$ are each the hydrocarbon radical directly linked to the hydroxyl group of a beta,gamma-monoolefinic monohydric alcohol having the carbon atom of a terminal methylene group as the gamma carbon atom thereof, and D is a divalent saturated unsubstituted hydrocarbon radical of 1 to 17 carbon atoms.

8. A process for the production of polymer which comprises heating a compound in the liquid phase at a temperature between 50° C. and 250° C. while intermittently adding to the compound a peroxide polymerization catalyst, said compound being represented by the general formula

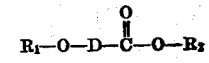

wherein $R_1$ and $R_2$ are each the hydrocarbon radical directly linked to the hydroxyl group of a beta,gamma-monoolefinic monohydric alcohol having the carbon atom of a terminal methylene group as the gamma carbon atom thereof, and D is a divalent saturated unsubstituted hydrocarbon radical of 1 to 17 carbon atoms.

9. A process which comprises heating in liquid phase at a temperature of 50° C. to 250° C. while intimately contacting said compound with a molecular oxygen-containing gas, said compound being represented by the general formula

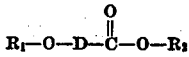

wherein $R_1$ and $R_2$ are each the hydrocarbon radical directly linked to the hydroxyl group of a beta,gamma-monoolefinic monohydric alcohol having the carbon atom of a terminal methylene group as the gamma carbon atom thereof, and D is a divalent saturated unsubstituted hydrocarbon radical of 1 to 17 carbon atoms.

10. A process which comprises heating at a temperature of 50° C. to 250° C. in liquid phase a compound represented by the general formula

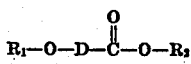

wherein $R_1$ and $R_2$ are each the hydrocarbon radical directly linked to the hydroxyl group of a beta,gamma-monoolefinic monohydric alcohol having the carbon atom of a terminal methylene group as the gamma carbon atom thereof, and D is a divalent saturated unsubstituted hydrocarbon radical of 1 to 17 carbon atoms, said heating being continued until an insoluble and infusible polymer is formed.

11. A process for the production of an insoluble and infusible polymer which comprises heating at a temperature of 100° C. to 150° C. in liquid phase a compound represented by the general formula

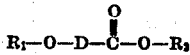

wherein $R_1$ and $R_2$ are each the hydrocarbon radical directly linked to the hydroxyl group of a beta,gamma-monoolefinic monhydric alcohol having the carbon atom of a terminal methylene group as the gamma carbon atom thereof, and D is a divalent saturated unsubstituted hydrocarbon radical of 1 to 17 carbon atoms, said heating being effected while intimately dispersing a molecular oxygen-containing gas through said compound until gelling occurs, separating the formed gel from the reaction mixture, incorporating a peroxide polymerization catalyst with the separated gel, and forming an insoluble and infusible polymer by subjecting the mixture of gel and catalyst to a temperature above 100° C. but below charring temperature and to a sufficient pressure to give a coherent mass.

12. The process according to claim 11 wherein the compound is allyl alloxyacetate.

13. The process according to claim 11 wherein the compound is allyl alpha-alloxypropionate.

14. The process according to claim 11 wherein the compound is allyl beta-alloxypropionate.

15. A process which comprises the steps of heating allyl alloxyacetate in the presence of benzoyl peroxide at a temperature of 50° C. to 80° C., discontinuing the polymerization just prior to gelling, steam distilling unchanged monomer from the reaction mixture at a subatmospheric pressure sufficiently low that gelling of the mass does not occur, and further heating the resulting residual and soluble polymer in the presence of benzoyl peroxide.

16. A process of polymerizing a compound represented by the general formula

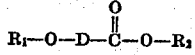

wherein $R_1$ and $R_2$ are allyl groups and D is a divalent saturated unsubstituted hydrocarbon radical of 1 to 17 carbon atoms, which comprises heating and polymerizing said compound at 50° C. to 250° C. in liquid phase and in the presence of a peroxide polymerization catalyst.

17. A polymer of a compound represented by the general formula

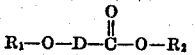

wherein $R_1$ and $R_2$ are allyl groups and D is a divalent saturated unsubstituted hydrocarbon radical of 1 to 17 carbon atoms.

DAVID E. ADELSON.
HANS DANNENBERG.

REFERENCES CITED

The following references are of record in the file of this patent:

UNITED STATES PATENTS

| Number | Name | Date |
| --- | --- | --- |
| 2,273,891 | Pollack et al. | Feb. 24, 1942 |
| 2,302,618 | Loder | Nov. 17, 1942 |